United States Patent [19]

Powell et al.

[11] Patent Number: 5,692,864
[45] Date of Patent: Dec. 2, 1997

[54] SELF-THREADING ANCHOR WITH SPREADABLE LEG PORTIONS JOINED BY A FRANGIBLE DRILL END PORTION

[75] Inventors: Kenneth Simpson Powell, Lilburn; Causie C. Crane, Loganville, both of Ga.

[73] Assignee: K & R Industries, Inc., Lawrenceville, Ga.

[21] Appl. No.: 576,302

[22] Filed: Dec. 21, 1995

[51] Int. Cl.$^6$ ........................................ F16B 13/04
[52] U.S. Cl. .................. 411/30; 411/60; 411/384; 411/419
[58] Field of Search ................... 411/30, 60, 71, 411/72, 387, 418, 419

[56] References Cited

U.S. PATENT DOCUMENTS

| | | |
|---|---|---|
| 126,366 | 4/1872 | Wills . |
| 1,051,444 | 1/1913 | Pleister . |
| 1,248,008 | 11/1917 | Pleister . |
| 1,825,419 | 9/1931 | Plym . |
| 2,263,424 | 11/1941 | Langer . |
| 2,400,684 | 5/1946 | Clark . |
| 2,654,284 | 10/1953 | Schevenell . |
| 3,183,531 | 5/1965 | McKewan . |
| 3,318,182 | 5/1967 | Carlson . |
| 3,385,156 | 5/1968 | Polos . |
| 3,522,756 | 8/1970 | Von Wolff ........................ 411/60 |
| 3,578,762 | 5/1971 | Siebol . |
| 3,662,644 | 5/1972 | Flesch et al. . |
| 4,075,924 | 2/1978 | McSherry et al. . |
| 4,202,244 | 5/1980 | Gutshall . |
| 4,221,154 | 9/1980 | McSherry . |
| 4,233,881 | 11/1980 | Carrier . |
| 4,322,194 | 3/1982 | Einhorn ........................ 411/30 |
| 4,488,843 | 12/1984 | Achille . |
| 4,601,625 | 7/1986 | Ernst et al. . |
| 4,642,012 | 2/1987 | Blucher et al. . |
| 4,708,552 | 11/1987 | Bustos ........................ 411/60 |
| 4,856,951 | 8/1989 | Blucher et al. . |
| 4,871,289 | 10/1989 | Choinire . |
| 5,039,262 | 8/1991 | Giannuzzi ........................ 411/30 |
| 5,145,301 | 9/1992 | Yamamoto . |
| 5,160,225 | 11/1992 | Chern ........................ 411/30 |
| 5,161,296 | 11/1992 | Garfield et al. . |
| 5,190,425 | 3/1993 | Wieder et al. . |
| 5,308,203 | 5/1994 | McSherry et al. . |
| 5,403,137 | 4/1995 | Grün et al. . |
| 5,413,444 | 5/1995 | Thomas et al. . |
| 5,449,257 | 9/1995 | Giannuzzi . |

FOREIGN PATENT DOCUMENTS

| | | | |
|---|---|---|---|
| 274731 | 5/1914 | Germany ........................ 411/60 |
| 1166262 | 10/1969 | United Kingdom ........................ 411/60 |

*Primary Examiner*—Flemming Saether
*Attorney, Agent, or Firm*—Brooks & Kushman P.C.

[57] ABSTRACT

The present invention discloses a self-tapping anchor and a method of installing the anchor into a wall. The anchor includes a flange portion, a drill end portion, and an intermediate shank portion. The intermediate shank portion has a central bore therein for receiving a fastener. An external thread is formed on the shank portion for threading the anchor into the wall. The shank portion is divided by a slot into a pair of leg portions and the external thread is divided into a plurality of discrete thread segments. The drill end portion supports the leg portions to prevent relative twisting therebetween during anchor installation into a wall. A reduced thickness web portion, or alternatively, a through slot, is formed in the drill end portion. When the threaded fastener is threaded into the central bore, the fastener causes the drill end portion to split apart releasing the leg portions so that the leg portions diverge to provide better anchor securement to the wall.

11 Claims, 2 Drawing Sheets

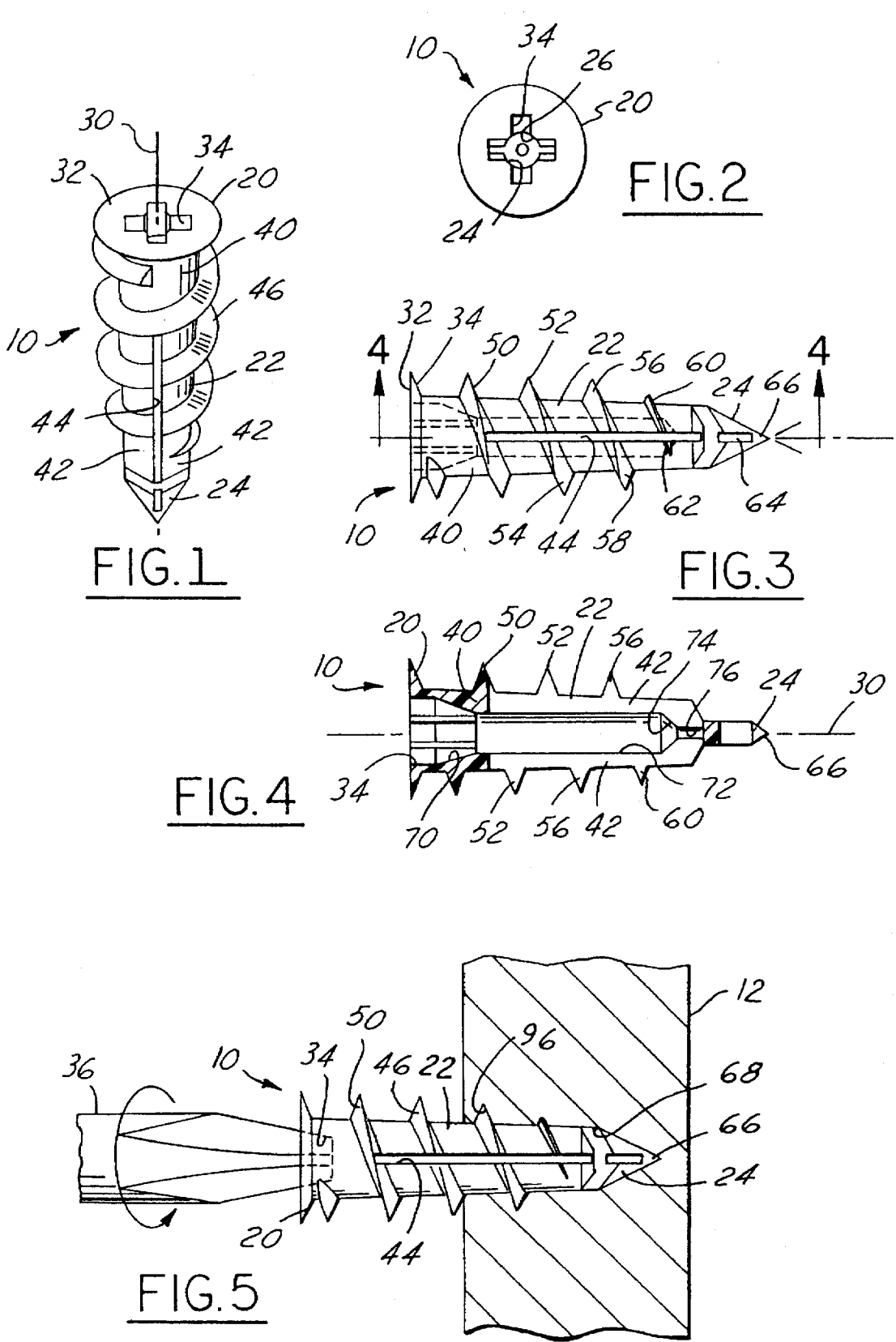

5,692,864

SELF-THREADING ANCHOR WITH SPREADABLE LEG PORTIONS JOINED BY A FRANGIBLE DRILL END PORTION

TECHNICAL FIELD

This invention relates to anchors which attach to walls and receive fasteners therein to hold objects to the walls.

BACKGROUND OF THE INVENTION

Anchors are used to retain objects to walls wherein simple threaded fasteners or screws would not have sufficient holding power. Typically, fasteners are installed in the anchors after the anchors are affixed to the walls. The anchors provide increased holding power by providing greater thread engagement area with the walls than by using the fasteners alone. Alternatively, the anchors may have leg portions which diverge relative to a flange portion to wedgingly retain the anchors in the walls.

These anchors may be classified in several groups. First there are anchors which require that a hole in a wall be made prior to anchor installation. Examples include U.S. Pat. Nos. 4,233,881, 4,488,843, 4,871,289 and 5,403,137. The obvious shortcoming with the use of these anchors is that a separate tool is needed to make the holes in the walls.

A second group of anchors include those which are self-drilling and self-tapping. Drill portions on these anchors are used to create a hole. Then, a fixed size thread on the exterior of the anchors create a corresponding thread within the holes. These anchors rely on only the shear area of the threads to hold the anchor in place. Examples of these anchors are described in U.S. Pat. Nos. 4,601,625, 5,190,425, 5,308,203 and 5,449,257. However, these fixed sized threaded anchors cannot utilize the geometric wedge-type of holding power available on anchors with spreadable or divergent legs.

A third group includes anchors which are self-installing and have leg portions which spread apart relative to the head or flange of the anchors. Typically, when fasteners or like inserts are installed in these anchors, the fasteners or inserts cam the spreadable legs portions apart. Therefore, the ends of divergent leg portions occupy a greater space or diameter than the portion of the wall hole adjacent the wall surface thus preventing anchor withdrawal.

Conventionally, these anchors are driven into a wall using a hammer. Then, as a fastener or insert is placed into a central bore of the anchor, the leg portions are torn and cammed apart by the fastener or insert. Examples are found in U.S. Pat. No. 4,322,194 and 4,708,552.

These anchors are quite good because they are easy to install, i.e., are simply hammered into the wall. Also, the divergent leg portions provide significant resistance to anchor withdrawal. However, these anchors also have flaws. First, because the anchors are not threaded, they cannot be easily removed without damaging the hole in the wall. Second, as the anchors are pounded into place, smooth bored holes are created in the wall. In contrast, anchors with threaded exteriors create large shear resistance areas because they cut and are retained in corresponding helical threads in a wall.

The present invention is intended to overcome shortcomings of the above cited anchors.

SUMMARY OF THE INVENTION

It is an object of the present invention to provide an anchor which is self-drilling and self-tapping into a wall and which has leg portions, with thread segments thereon, which are radially spreadable upon insertion of a fastener into the anchor so that the anchor is held by not only the shear resistance of the thread segments but also by the wedging effect of the divergent leg portions.

It is another object to provide a threaded anchor having a frangible drill end portion which holds discrete thread segments on separate leg portions in helical alignment during tapping installation of the anchor while later allowing the threaded leg portions to cam apart in response to a fastener being installed within a central bore of the anchor.

It is another object to provide an anchor having a flat spade-shaped drill end portion with a frangible web portion which holds the drill end portion together during drilling while allowing the drill end portion to split apart to accommodate the spreading of the leg portions.

In meeting these objectives, a self-tapping anchor which is threadably mountable in a wall using a screwdriver or other tool is disclosed. A fastener is retained within the anchor to hold an object to a wall. The anchor includes a flange portion, a drill end portion and a shank portion extending forwardly from the flange portion to the shank portion along a longitudinal axis.

The flange portion includes a radially outwardly extending flange for engaging the wall and a non-circular opening therein for receiving a tool to screw the anchor into the wall. The drill end portion has at least one cutting edge thereon to bore a hole in the wall.

The shank portion includes an external helical thread thereon and a longitudinally extending central bore therein for receiving the fastener. A slot is formed in the shank portion which extends laterally therethrough so that the shank portion includes a pair of radially spaced apart leg portions and the external thread is divided into a plurality of helically aligned thread segments. The drill end portion supports the leg portions to prevent relative twisting between the leg portions.

A tool, such as a screwdriver, may be used to rotate the anchor with respect to the wall with the drill end portion drilling a hole in the wall. Concurrently, the external thread cuts a corresponding thread in the hole with the drill end portion keeping the discrete thread segments in helical alignment during the tapping of the hole. Insertion of the fastener within the central bore causes the leg portions to cam outwardly with the anchor splitting apart allowing the leg portions to diverge to wedgingly retain the anchor within the wall and causing the external thread to bit even more deeply into the wall and increase the resistance to anchor pull-out.

Preferably, the drill end portion includes a reduced thickness web portion. Ideally, the reduced thickness web portion extends along the longitudinal axis so that the drill end portion splits generally along the longitudinal axis.

The invention also includes a method of mounting an object to a wall. The method comprises the following steps. An anchor is used to self-drill and self-tap into a wall a hole with threads. The anchor has external threads, a central bore and a pair of leg portions. Next, a fastener is inserted within the central bore causing a portion of the anchor to tear apart with the threaded leg portions being cammed radially apart. Accordingly, this method allows the anchor to be held within the hole by the threaded leg portions diverging apart from one another. Also, shear resistance to anchor withdrawal is provided to the anchor thread by the wall thread.

BRIEF DESCRIPTION OF THE DRAWINGS

These and other features, objects and advantages of the present invention will become readily apparent from the following description, pending claims and accompanying sheets of drawings where:

FIG. 1 is a perspective view of an anchor made in accordance with the present invention;

FIG. 2 is an end elevational view of the anchor;

FIG. 3 is a side elevational view of the anchor;

FIG. 4 is a sectional view taken along line 4—4 in FIG. 3;

FIG. 5 is a view, partially in section, of a screwdriver threadedly screwing the anchor into a wall;

BEST MODE FOR CARRYING OUT THE INVENTION

Figure 6:
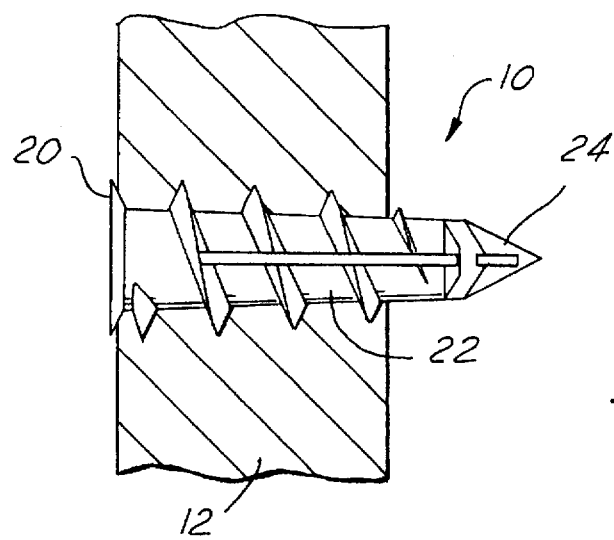
FIG. 6 is a view, partially in section, of the anchor installed in the wall.
Figure 7:
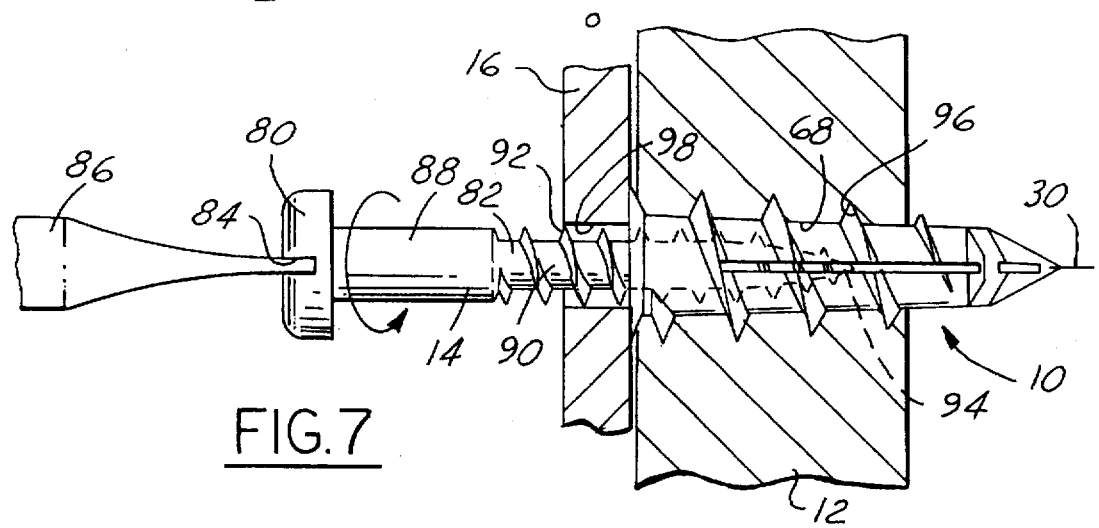
FIG. 7 is a view, partially in section, of a fastener mounting a plate to a wall and threading into a bore of the anchor.
Figure 8:
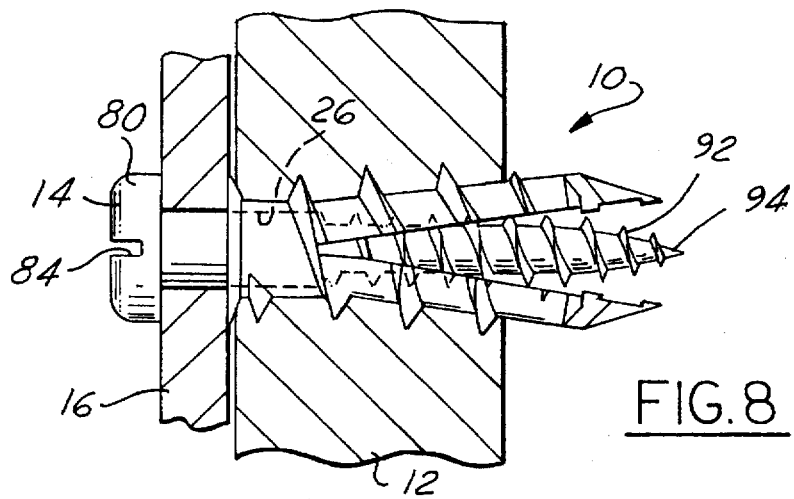
FIG. 8 is a view, partially in section, of the threaded fastener fully installed within the anchor with a drill end portion split apart and leg portions divering radially outboard from one another.

An exemplary anchor 10, made in accordance with the present invention, is shown in FIGS. 1-8. Anchor 10 is a self-tapping fastener which may be threaded into a wall 12. Ideally, wall 12 is made of a friable material such as conventional wall board stock. A threaded fastener 14, preferably metallic, is threaded into anchor 10, as shown in FIGS. 7 and 8, to retain a plate 16 or the like, to wall 12.

Preferably, anchor 10 is integral and is made utilizing an injection molding process. In the preferred embodiment, anchor 10 is made from a nylon which is filled with 30% glass. Alternatively, anchor 10 could be made of a zinc alloy such as zamac.

Anchor 10 includes a flange portion 20, a shank portion 22 and a drill end portion 24. A fluted central bore 26 extends through flange portion 20 and shank portion 22 along a longitudinal axis 30. A cross-shaped opening 34 is formed in the rear portion of central bore 26 and extends through flange portion 20 and into the rear portion of shank portion 22. Opening 34 is configured to receive the tip of a phillips head screwdriver 36 as seen in FIG. 5.

Shank portion 22 includes a circumferentially continuous cylinder portion 40 to which are connected a pair of radially spaced apart leg portions 42. Drill end portion 24 is connected to the forward end of leg portions 42. A laterally extending slot 44 aligned along longitudinal axis 30 bifurcates that segment of shank portion 22 into leg portions 42.

An external thread 46 helically coils about the exterior of shank portion 22. External thread 46 tapers downwardly from a maximum diameter adjacent flange portion 20 until blending into the outer surface of a leg portion 42 adjacent drill end portion 24. A first thread segment 50 of external thread 46 spirals continuously about cylinder portion 40 from adjacent flange portion 20 until reaching slot 44. A number of discrete thread segments 52, 54, 56, 58, 60 and 62 are included in thread 46 on leg portions 42 due to slot 44 extending through shank portion 22.

Drill end portion 24 is generally planar and is triangular or spade shaped as seen in FIG. 3. Extending along longitudinal axis 30 is a reduced thickness web portion 64. Alternatively, web portion 64 could be of minimal thickness or even a through opening. In this exemplary embodiment, drill end portion 24 has an overall thickness of 0.090 inches while web portion 64 is only 0.014 inches thick, 0.036 inches wide and 0.350 inches long. A tip 66 has an overall angle alpha of 55° and is sufficiently sharp to easily penetrate wall 12.

Central bore 26, as seen in FIG. 4, includes screwdriver opening 34, a tapered portion 70, a straight portion 72, a countersunk portion 74 and forward cylindrical portion 76. Slot 44 is 0.036 inches wide. Forward portion 76 has relatively sharp corners therein which serve as stress risers.

Threaded fastener 14, illustrated in FIGS. 7 and 8, has a head portion 80 and a shank portion 82. Head portion 80 includes a slot 84 therein for receiving the tip of a flat head screwdriver 86. Shank portion 82 has a smooth portion 88 and a threaded portion 90 with a thread 92 thereon. Threaded portion 90 tapers down to a point 94 at the forward end of fastener 14.

In operation, as seen in FIG. 5, tip 66 of anchor 10 is placed against wall 12. The tip of screwdriver 36 is inserted into screwdriver opening 34 and axial pressure is applied along longitudinal axis 30 to anchor 10 as screwdriver 36 is rotated. Drill end portion 24 cuts or drills into wall 12 creating a hole 70 in wall 12 equal to the maximum width of drill end portion 24. When thread 46 reaches wall 12, thread 46 cuts a corresponding helical thread 96 into wall 12. Installation of anchor 10 in wall 12 is complete when flange portion 20 abuts wall 12. This completed installation is seen in FIG. 6. Besides drilling a bore in wall 12, drill end portion 24 serves to prevent leg portions 42 from twisting with respect to one another. This insures the discrete thread segments 50, 52, 54, 56, 60 and 62 remain helically in alignment as they cut wall thread 96 into wall 12.

Referring now to FIG. 7, fastener 14 and plate 16 are mounted to anchor 10. Plate 16 has an opening 98 therein which is coaxially aligned with longitudinal axis 30. Fastener 14 is guided through opening 98 and into abutment with central bore 26 of anchor 10.

Screwdriver 86 is then used to apply axially pressure to and rotate fastener 14. Threads 92 on fastener 14 cut a corresponding helix of threaded grooves into the flutes of central bore 26. When point 94 reaches countersunk portion 76 of central bore 26, fastener 14 will place large radially outwardly directed forces on drill end portion 24. This causes a crack to initiate which propagates through web portion 64 causing drill end portion 24 to split in half. Consequently, leg portions 42 are no longer supported at their forward ends, i.e., they are cantilevered from cylinder portion 40. The radially outwardly directed forces exerted by fastener 14 on leg portions 42 causes leg portions 42 to move radially outwardly into wall hole 68. As leg portions 42 are wedged radially outwardly from cylinder portion 40, anchor 10 is solidly held within wall 12. A portion of thread 92 is retained in central bore 26 thereby affixing fastener 14 and plate 16 to wall 12.

While in the foregoing specification this invention has been described in relation to a certain preferred embodiment thereof, and many details have been set forth for the purpose of illustration, it will be apparent to those skilled in the art that the invention is susceptible to alteration and that certain other details described herein can vary considerably without departing from the basic principles of the invention.

What is claimed is:

1. A self-tapping anchor for threaded mounting in a wall to receive a threaded fastener to anchor the fastener in the wall, the anchor comprising:

a flange portion, a drill end portion and a shank portion extending between the flange and drill end portions with a bore extending through the flange and shank portions and terminating at the drill end portion;

an external helical thread on the shank portion between the flange portion and the drill end portion;

said bore configured in the flange portion adapted to drivingly engage a tool for rotating the anchor to thread it into the wall;

said shank portion and helical thread bifurcated longitudinally of the anchor to form a pair of discrete legs having external helically aligned thread segments on opposite sides of said bifurcation with the legs extending from beneath the flange to the drill end portion and held together at the drill end portion; and said drill end portion being configured as a spade-like drill bit and arranged to hold said discrete legs against twisting and separation with respect to one another as the anchor is threaded into the wall but adapted to separate as a fastener is driven into said bore imposing lateral outward stresses on said legs, allowing said legs to separate laterally into diverging relation driving the external helical thread segments on the legs into the wall to secure the anchor and fastener in the wall.

2. The anchor of claim 1 wherein:

the drill end portion includes a reduced thickness web portion along which the anchor splits to allow said legs to separate and diverge.

3. The anchor of claim 2 wherein:

the reduced thickness web portion extends along the longitudinal axis so that the drill end portion splits generally along the longitudinal axis of the anchor.

4. The anchor of claim 1 wherein:

said bore has a forward end portion adjacent the drill end portion with a radially inwardly tapered surface such that when the fastener strikes the tapered surface, the fastener places radially outwardly directed forces on the tapered surface causing the anchor to split apart.

5. The anchor of claim 1 wherein:

the drill end portion has a pair of cutting edges which converge to a point.

6. The anchor of claim 5 wherein:

the drill end portion is generally planar forming a spade-shape.

7. The anchor of claim 1 wherein:

the external thread tapers radially downwardly in the forward longitudinal direction.

8. The anchor of claim 1 wherein:

the bore is fluted.

9. The anchor of claim 1 wherein:

the shank portion includes a cylinder portion which is circumferentially continuous and from which the leg portions are cantilevered when the anchor is split apart.

10. The anchor of claim 1 wherein:

the external thread blends into one of the leg portions so as to produce a smooth entry into the bored hole in the wall to initiate the tapping operation.

11. The fastener of claim 1 wherein said external helical thread on the shank portion extends from adjacent the flange portion to adjacent the drill end portion.

* * * * *